March 21, 1939.  H. I. BECKER  2,151,549

AIRCRAFT LANDING EQUIPMENT

Filed July 6, 1936

Inventor:
Howard I. Becker,
by Harry E. Dunham
His Attorney.

Patented Mar. 21, 1939

2,151,549

UNITED STATES PATENT OFFICE 2,151,549

AIRCRAFT LANDING EQUIPMENT

Howard L. Becker, Schenectady, N. Y., assignor to General Electric Company, a corporation of New York Application July 6, 1936, Serial No. 89,010

2 Claims. (Cl. 250—11)

My invention relates to aircraft landing equipment.

It is the object of my invention to provide improved equipment of this character with which a pilot upon approaching a landing area in darkness or in fog may obtain a picture of the area which will assist him in making a desired landing thereon.

In accordance with my invention I mark the landing area with one or more short wave radio transmitters. Preferably I employ a number of such transmitters which are arranged to mark the boundary of the landing area. The aircraft is provided with apparatus for receiving the short waves from said transmitters which apparatus includes a directive receiver. Means are provided for causing the receiver to scan a selected area such as that toward which the craft is headed and means operative in response to the radio waves received by said receiver are provided for producing a picture visible to the pilot of the transmitter or transmitters.

My invention will be better understood from the following description taken in connection with the accompanying drawing, and its scope will be pointed out in the appended claims.

Figure 1:
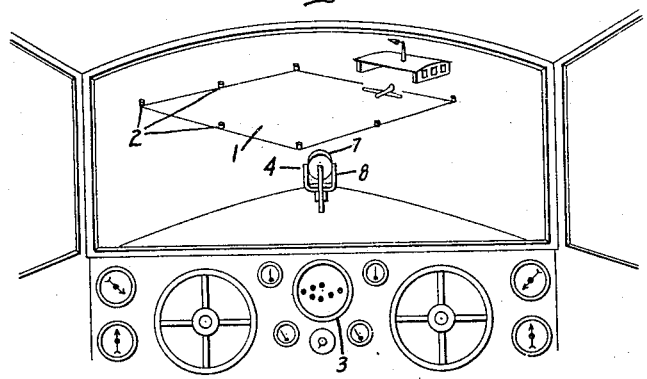
Figure 2:
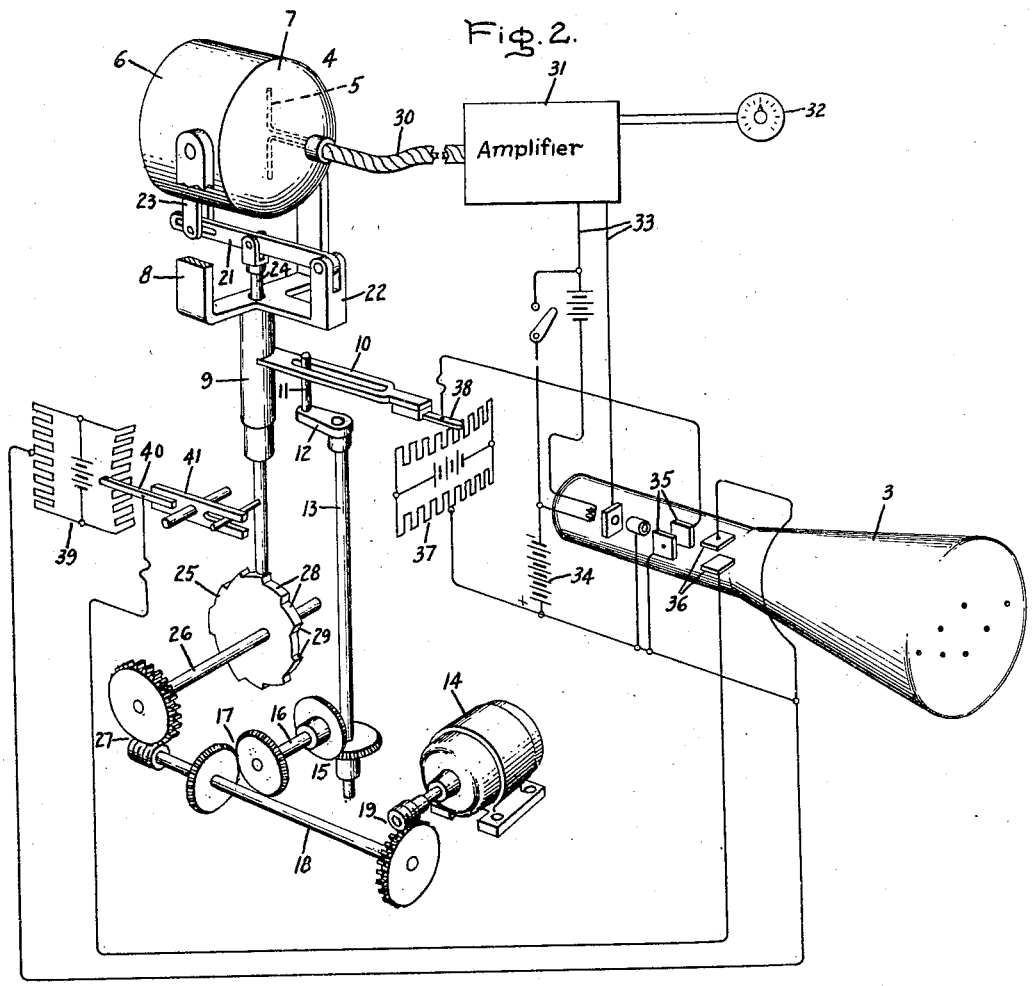

Referring to the drawing, Fig. 1 is a view such as might be obtained by a pilot in an aircraft looking forward in the day time toward a landing area marked with radio transmitters, and Fig. 2 is a combined circuit diagram and perspective view of the apparatus including a part of my invention carried by the aircraft.

In Fig. 1 I have represented at 1 a landing area such as might be seen by the pilot looking forward from his position in the craft, the area being marked with the radio transmitters 2. On the instrument board of the craft I have shown the end of a cathode ray tube 3 upon which a picture is produced of the arrangement of transmitters 2.

Referring now to Fig. 2 where I have shown the apparatus for receiving the radio waves broadcast from the several transmitters 2 (Fig. 1) and by which the picture of the arrangement of the transmitters is produced, the radio waves from the several transmitters are picked up by the directive receiver 4 as that receiver is caused to scan a given area which in this case is directly in front of the craft. The receiver 4 comprises the directive antenna 5 which is mounted within the cylinder or drum 6 and which preferably is provided with the reflector 7 to increase its directive properties. This drum is mounted on trunnions supported by the fork 8 carried by the shaft 9, which it will be understood is supported in suitable bearings, not shown.

For causing the drum with its enclosed antenna to oscillate horizontally the shaft 9 is provided with the arm 10 having a slot therein which is engaged by the pin 11 mounted on crank 12 secured to the shaft 13. This shaft is rotated by the motor 14 to which it is connected through the bevel gearing 15, the shaft 16, the bevel gearing 17, the shaft 18 and the worm gearing 19.

At the end of each horizontal swing the drum 7 is tilted slightly up or down by the operation of the same motor 14. The means for producing this tilt is shown comprising the lever 21 fulcrumed at one end to the extension 22 of the fork 8 and having the opposite end connected by a pin and slot connection with the lugs 23 on the drum 6. Connected to an intermediate point of the lever 21 is the rod 24 which slides in and is concentric with the shaft 9 and has its lower end in engagement with the stepped cam 25. This cam is mounted eccentrically on the shaft 26, which is connected by the worm gearing 27 with the shaft 18. The surface of the cam comprises a number of portions 28 which are concentric with the shaft 26, which portions are connected with each other by the steps 29. As the cam rotates the rod 24 is given an intermittent movement which is downward through one half rotation of the cam and is upward through the other half rotation thereof, it being understood that the stepped portions of the cam are so shaped that they also function as cams to move the rod upwardly or to allow it to drop downwardly in accordance with the position of the cam.

The gearing by which the drum containing the antenna is given these two movements by the same motor 14 is so constructed that the change in tilt of the drum takes place at the end of each oscillation thereof. Thus during each complete rotation of the cam a certain area which the craft is facing is scanned by the directive receiver. It will be understood that the rate of scanning need not be of such rapidity as is usual in television apparatus since it is necessary only that the pilot shall be able to see images of the radio transmitters sufficiently rapid to form an idea of the arrangement thereof and hence judge the location of the craft to the landing field.

The antenna 5 is shown connected through the flexible concentric conductor 30 with the amplifier 31 which is shown provided with the volume control 32. The output circuit 33 of the amplifier connects with the grid and cathode of the cathode ray tube 3 in the usual manner. This tube is provided with the usual anode, shown supplied by the battery 34, and with a common form of ray deflecting means comprising the one set of parallel plates 35 by which the ray is deflected horizontally and the other set of parallel plates 36 by which the ray is deflected vertically.

In order that the cathode ray of the tube 3 shall be deflected to scan the end of the tube in synchronism with the scanning movements of the drum 6, the two sets of deflecting plates 35 and 36 are supplied with variable voltages which vary respectively in accordance with the horizontal and the vertical positions of the drum. As an example of a device to produce such a variable voltage I have shown the device 37 which comprises two resistors connected in parallel with a battery. One of the two parallel plates 35 connects with the midpoint of one resistor and the other plate connects with the contact arm 38 which slides on the other resistor and which is secured to the arm 10. Horizontal movements of the drum 6, therefore, cause varying voltages to be applied to the plates 35 in synchronism with the horizontal movements of the drum. A similar variable voltage device 39 connects with the plates 36, the movable contact arm 40 in this case being mounted on one end of the lever 41, the opposite end of which has a pin and slot connection with the rod 24, whence the voltages applied to the plates 36 vary in synchronism with vertical movements of the drum.

By means of the above-described apparatus a pilot in approaching a landing area, such as an airport, which is marked in the manner described but which is obscured from view because of fog, clouds or darkness, may obtain a picture of the landing area as marked by the several transmitters such as it might appear were the transmitters directly visible. The cathode ray tube upon which appears the picture is preferably located in a position where it is easily observed by the pilot and the apparatus by which the tube is operated is automatic in its operation requiring no attention from the pilot except possibly to vary the size or focus of the cathode ray by adjusting the volume control 32.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. Aircraft landing equipment comprising a plurality of radio transmitters arranged to mark a landing area, radio receiving apparatus including an antenna directive in two planes substantially at right angles to each other carried by said craft, motor mechanism for moving said antenna to cause it to scan said area successively in spaced paths, a receiver comprising a cathode ray tube, means for varying the intensity of the cathode ray thereof in accordance with the output of said antenna and means for producing scanning movements of the ray corresponding with the movements of said antenna.

2. Aircraft landing equipment comprising a plurality of radio transmitters arranged to mark a landing area, radio receiving apparatus including an antenna means directive in two planes substantially at right angles to each other carried by said craft, motor mechanism for moving said antenna means to cause it to scan said area successively in spaced paths, a receiver comprising a cathode ray tube, means for varying the intensity of the cathode ray thereof in accordance with the output of said antenna means and means for producing scanning movements of the ray corresponding with the movements of said antenna means.

HOWARD I. BECKER.